(12) United States Patent
Lyons

(10) Patent No.: US 8,082,213 B2
(45) Date of Patent: Dec. 20, 2011

(54) METHOD AND SYSTEM FOR PERSONALIZED ONLINE SECURITY

(76) Inventor: Jarlath Lyons, Seattle, WA (US)

( * ) Notice: Subject to any disclaimer, the term of this patent is extended or adjusted under 35 U.S.C. 154(b) by 1058 days.

(21) Appl. No.: 11/477,203

(22) Filed: Jun. 27, 2006

(65) Prior Publication Data

US 2007/0016527 A1    Jan. 18, 2007

Related U.S. Application Data

(60) Provisional application No. 60/694,288, filed on Jun. 27, 2005.

(51) Int. Cl.
 *G06F 20/00* (2006.01)
(52) U.S. Cl. .............. 705/67; 705/59; 705/64; 713/155; 713/168
(58) Field of Classification Search ............ 705/59, 705/50, 67
See application file for complete search history.

(56) References Cited

U.S. PATENT DOCUMENTS 6,957,199 B1 * 10/2005 Fisher ............................ 705/78
2006/0179003 A1 * 8/2006 Steele et al. .................... 705/59

* cited by examiner

*Primary Examiner* — Chrystina Zelaskiewicz
(74) *Attorney, Agent, or Firm* — Olympic Patent Works PLLC

(57) ABSTRACT

Various embodiments of the present invention provide strong authentication of users on behalf of commercial entities and other parties to electronic transactions. In these embodiments of the present invention, a user interacts with an authentication service provider to establish policies for subsequent authentication of the user. Thus, in these embodiments of the present invention, a user controls the level and complexity of authentication processes carried out by the authentication service provider on behalf of both the user and commercial entities and other entities seeking to authenticate the user in the course of conducting electronic transactions, electronic dialogues, and other interactions for which user authentication is needed. The policies specified by a user may include specification of variable-factor authentication, in which the user, during the course of an authentication, provides both secret information as well as evidence of control of a tangible object.

17 Claims, 10 Drawing Sheets

METHOD AND SYSTEM FOR PERSONALIZED ONLINE SECURITY

CROSS-REFERENCE TO RELATED APPLICATION

This application claims the benefit of U.S. Provisional Application No. 60/694,288, filed Jun. 27, 2005.

TECHNICAL FIELD

The present invention is related to user authentication services and, in particular, to a strong authentication service provided to, and controlled by, users authenticated by authentication-service clients, including various commercial clients, web sites, and other parties to electronic transactions and dialogues with users.

BACKGROUND OF THE INVENTION

With the advent of electronic-commerce-transaction systems, including automatic teller machines ("ATM"), Internet commerce, automated telephone transaction systems, and other electronic-commerce systems, the need for authenticating remote users by commercial enterprises that conduct transactions with remote users has become a central and continuing problem for commercial entities, including banks, sellers of products and services through the Internet, and other commercial entities. More recently, the need for authentication has become an increasingly vexatious and important problem for users, as well, as users seek to protect themselves from Internet fraud, banking fraud, identity theft, and other types of fraud. Many users are woefully unprepared to understand and assemble complex technologies currently available to secure electronic transactions, and, to users' disappointment, many of these currently available technologies are insufficient to protect users from fraudulent activities of thousands of determined and technology-savvy fraud artists. Although a large number of authentication protocols and strategies have been devised, soon after the advent of each new authentication protocol or strategy, new problems tend to quickly arise. Many current authentication services are based on password or other secret-information schemes, in which a user, during the course of an electronic transaction, provides a remote commercial entity or other remote entity with a password or other secret information to verify the user's identity. In certain stronger authentication systems, such as ATM systems, the user supplies both a password, or PIN number, as well as an ATM card with encoded information. As is obvious from the many news reports of increasing levels of fraud and illegal activities involving electronic transactions, both weak password-based and stronger two-phase authentication schemes are decidedly less than secure. A lost ATM card, loss of user information to various electronic eavesdropping devices, and other such events can quickly spell disaster for a user. Commercial entities, Internet service providers, users of commercial services provided through electronic media, and other parties and vendors involved in electronic transactions have all recognized the need for more reliable authentication of users of electronic-transaction services.

SUMMARY OF THE INVENTION

Various embodiments of the present invention provide strong authentication of users on behalf of commercial entities and other parties to electronic transactions. In these embodiments of the present invention, a user interacts with an authentication service provider to establish policies for subsequent authentication of the user. Thus, in these embodiments of the present invention, a user controls the level and complexity of authentication processes carried out by the authentication service provider on behalf of both the user and commercial entities and other entities seeking to authenticate the user in the course of conducting electronic transactions, electronic dialogues, and other interactions for which user authentication is needed. In many of the embodiments, the user and commercial entity are remote from one another, an communicate through an electronic communications medium. In other embodiments, the user may directly interact with a commercial or other entity that needs to identify the user. The policies specified by a user may include specification of variable-factor authentication, in which the user, during the course of an authentication, provides both secret information as well as evidence of control of a tangible object.

DETAILED DESCRIPTION OF THE INVENTION

Figure 1:
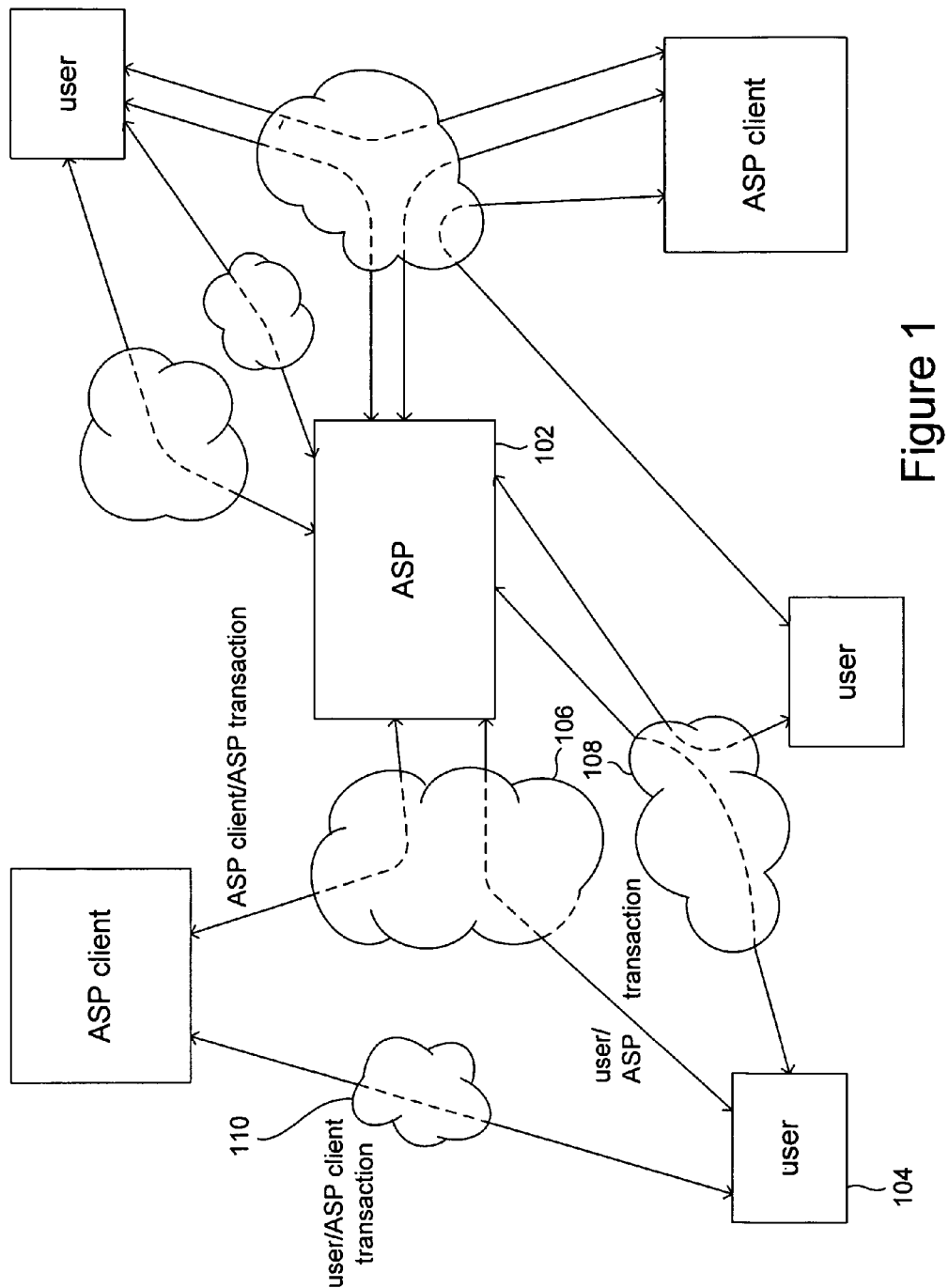
FIG. 1 shows general interactions between an authentication service provider ("ASP") that represents one embodiment of the present invention, users authenticated by the ASP, and ASP-clients that seek authentication of users from the ASP.

FIG. 1 shows the general interactions between an authentication service provider ("ASP") that represents one embodiment of the present invention, users authenticated by the ASP, and ASP-clients that seek authentication of users from the ASP. In many embodiments, the ASP 102 is a software-implemented service that runs on one or more computer systems interconnected by various communications media with both ASP clients and users. For example, as shown in FIG. 1, a first user 104 is interconnected with the ASP via two different communications media 106 and 108. The user 104 is also connected to an ASP client through yet another communications medium 110. A great many interconnection apologies and strategies are possible. For example, the user, an ASP client, and the ASP may all be interconnected through a single communications medium, such as the Internet. At another extreme, the user may be connected to the ASP client through one communications medium and to the ASP through one or more other communications medium, while the ASP client may be interconnected with the ASP through yet another, different communications medium. For certain types of authentication, including certain types of variable-factor authentication that represents one embodiment of the present invention and that is discussed below, a user needs to be interconnected with the ASP by at least two different types of communications media.

In general, users intercommunicate with ASP clients to conduct electronic transactions, such as ordering products and services, conducting dialogs with remote individuals, receiving information through interactive queries, and other such electronic transactions. An ASP client may attempt to authenticate a user by transmitting an ASP-client-transaction request to the ASP, in which the ASP client provides information, acquired from the user during the course of an initial portion of an electronic transaction, to the ASP and receives from the ASP an affirmative or negative authentication response. Based on that response, the ASP client may choose to allow or deny certain types of transactions, or may take other actions based the authentication reply.

A user may directly interact with the ASP in order to register with the ASP for subsequent authentications or, in other words, to be initialized for subsequent authentications by ASP clients. The user may also directly interact with the ASP in order to establish authentication policies and to update and revise authentication policies over time. The ASP interacts with the user in order to carry out authentications, on behalf of ASP clients, according to the authentication policies specified by the user. In these interactions, the ASP may interact with the user via two different communications media, such as a combination of the Internet and a cell phone.

Figure 2:
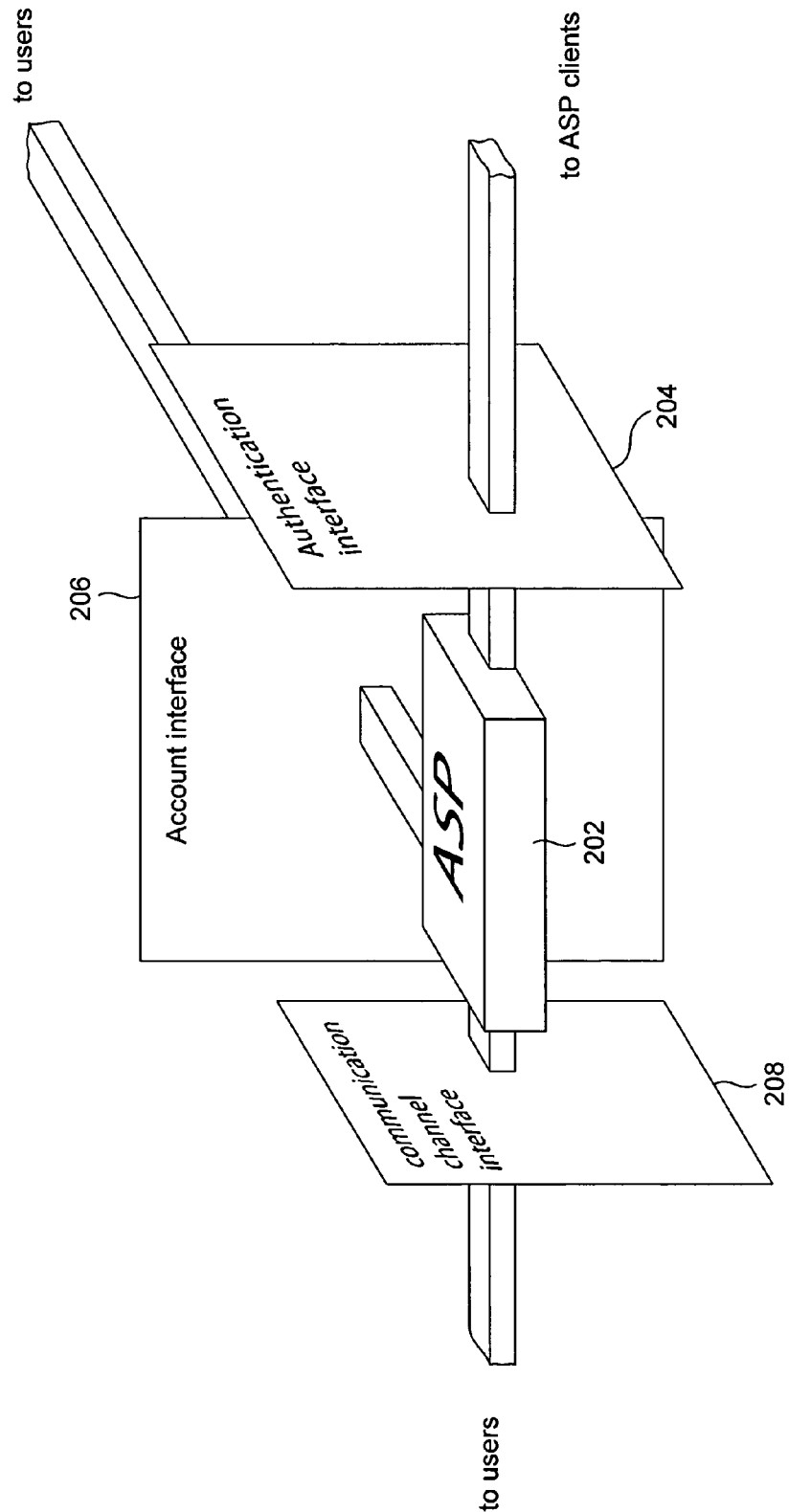
FIG. 2 illustrates three fundamental interfaces provided by the ASP to remote parties.

FIG. 2 illustrates three fundamental interfaces provided by the ASP to remote parties. The ASP provides an authentication interface 204 to ASP clients which allows ASP clients to request authentication of users during electronic transactions. The authentication interface may also provide a management and ASP-client-registration interface to allow ASP clients both to manage their interactions with the ASP and to establish policies for transmitting subsequent authentication requests. The ASP 202 provides an account interface 206 to users that allows users to establish accounts with the ASP, or register with the ASP, establish policies with the ASP, and to modify and update authentication policies over time. The a third interface 208 allows the ASP to interface with user devices through alternative communications media, such as a cell phone, fax machine, telephone, or other communications devices. The third interface 208 allows the ASP to interface with virtually any network enabled resource through an appropriate medium, including both physical devices such as a cell phone, fax machine, telephone, or other communications devices, and also soft devices, such as an instant messaging account, or an email account.

Figure 3:
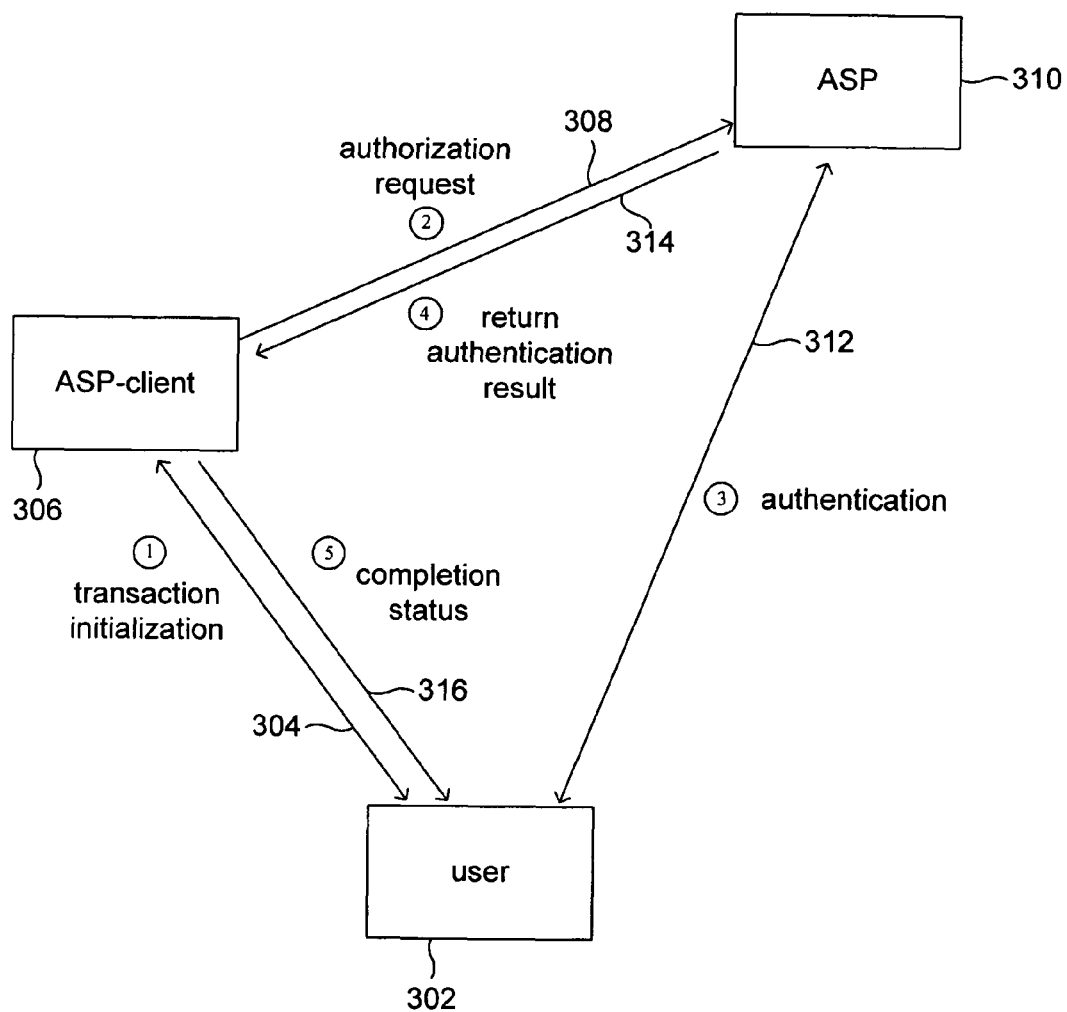
FIG. 3 illustrates a model interaction between a user, an ASP client, and an ASP.

FIG. 3 illustrates a model interaction between a user, an ASP client, and an ASP. The user 302 may initialize 304 an electronic transaction with the ASP client 306, such as by requesting to logon to a commercial website or requesting a product or service through an electronic medium. The ASP client and user carry out the initial part of the electronic transaction to the point that the ASP client has acquired sufficient information from the user to attempt to authenticate the user. The ASP client then transmits an authentication request 308 to the ASP 310, including information obtained from the user, to determine whether or not the user is authentic, so that the electronic transaction can proceed to completion. The ASP 310 then carries out an authentication transaction 312 with the user, in order to authenticate the user according to predetermined authentication protocols established by the user. This is an optional step, depending on the specified policies. The ASP, upon completion of the authentication transaction, then returns an authentication result 314 to the ASP client. The ASP client 306 then uses the authentication result to, for example, complete the transaction and return a transaction completion status 316 to the user.

Figure 4:
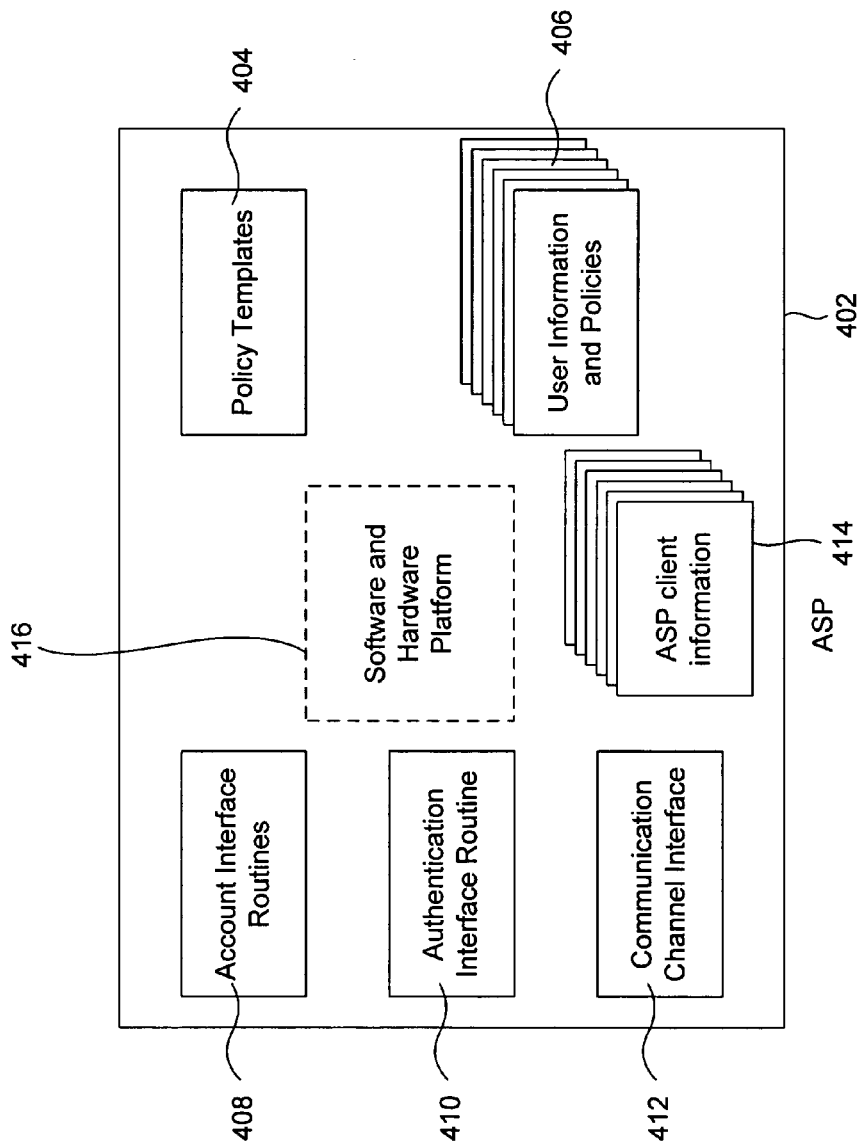
FIG. 4 illustrates components of an ASP.

FIG. 4 illustrates the components of an ASP. The ASP 402 includes policy templates 404 that may be used to describe the types of policies available to users and to allow users to specify policies based on templates. The ASP includes user information and policies 406, commonly stored within a database, for each registered user. The ASP includes account-interface routines 408, authentication-interface routines 410, and communication-channel-interface routines 412 that implement the account interface, authentication interface, and communications-channel interface, respectfully, described with reference to FIG. 3. The ASP may also include ASP-client information and policies 414 that are generally stored within a database, and the ASP is generally implemented above a software and hardware platform or platforms 416 that include operating systems, lower-level applications, and computer-server hardware.

Figure 5:
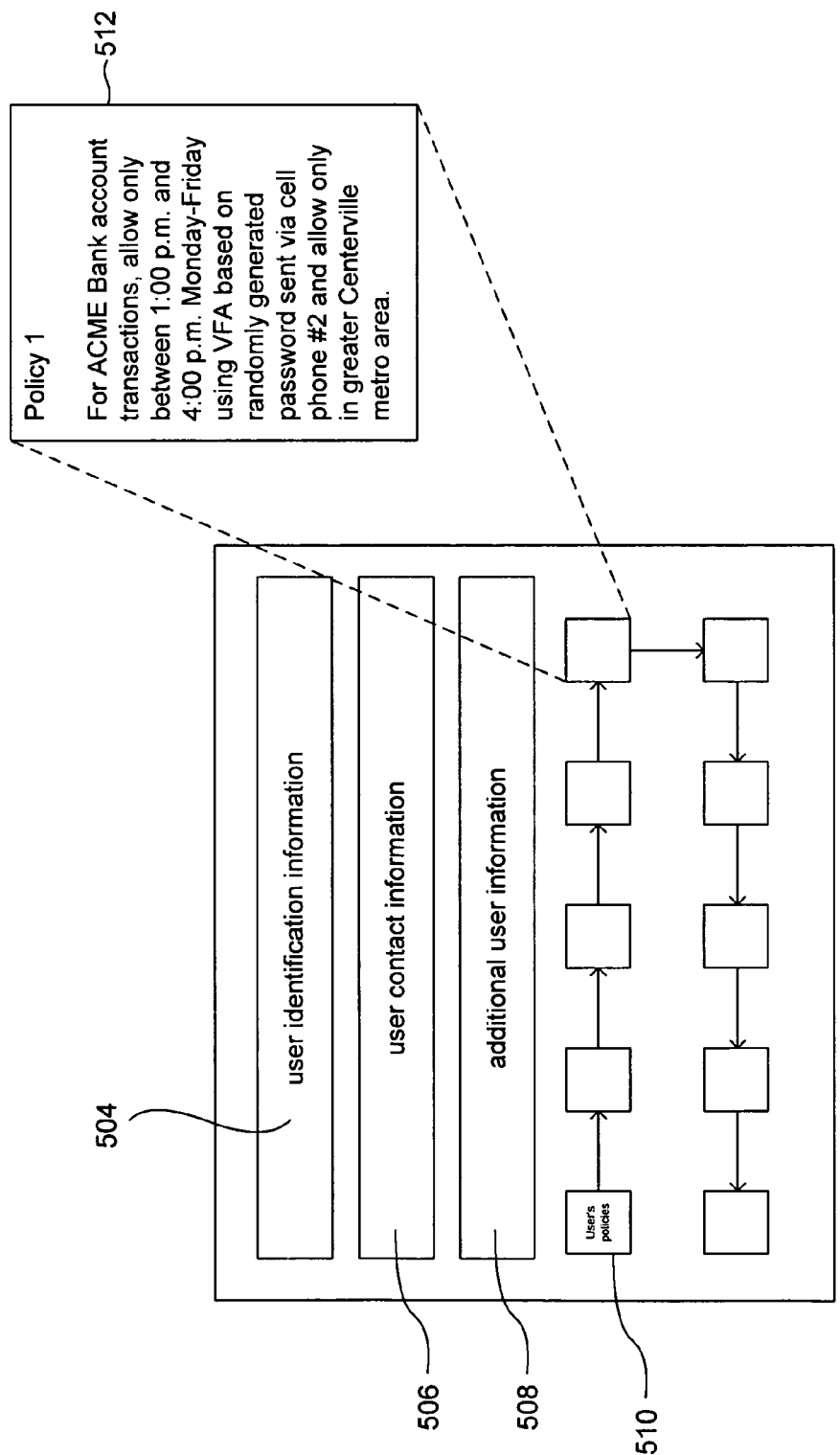
FIG. 5 illustrates an example of the user information and policies stored for a user by an ASP.

FIG. 5 illustrates an example of the user information and policies stored for a user by an ASP. As shown in FIG. 5, the user information may include user identification information 504, such as a user's name, a user's address, user-specified passwords, and other such information. User information also includes user contact information 506, such as the types and addresses or telephone numbers of the user's computer, cell phones, and other such contact information. User information may include additional information 508, including billing information, employment information, or other information needed by particular implementations of the ASP. Finally, the user information includes a list of policies 510. Each policy may be specified by the user according to a policy template provided by the ASP to user through the account interface. An exemplary policy 512 is shown in FIG. 5. The policy specifies that, for Acme Bank account transactions involving the Acme Bank and the user, only transactions that occur between 1:00 p.m. and 4:00 p.m. on Monday through Friday should be authorized, and authorization should involve variable-factor authentication using randomly generated passwords sent via the user's second cell phone and furnished by the user to ACME Bank during the transactions. Moreover, these transactions should be authorized only in the greater Centerville Metro area.

Figure 6:
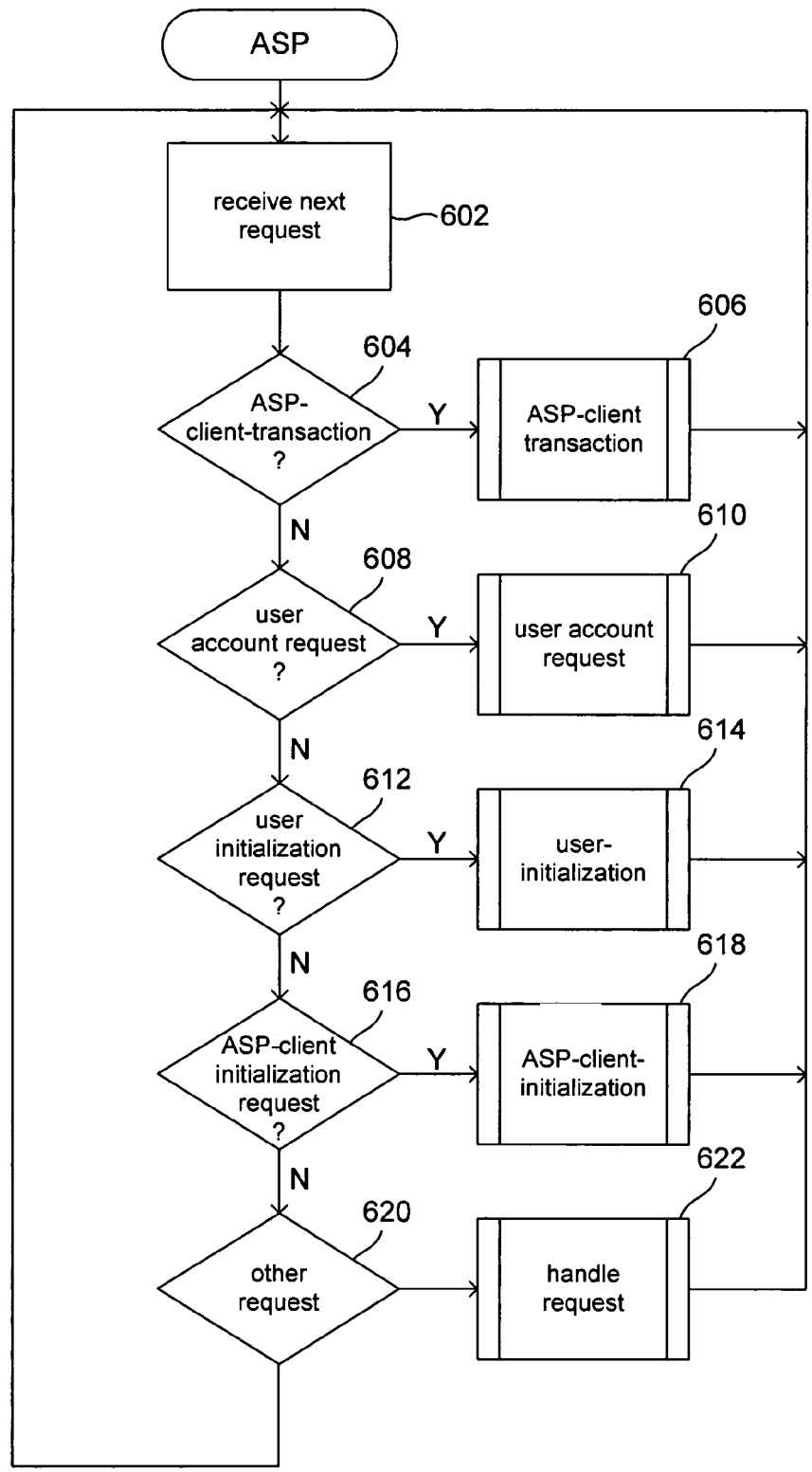
FIGS. 6-10 are control-flow diagrams that illustrate one embodiment of the ASP software routines that implement the account interface and authentication interface discussed above with reference to FIG. 2 and shown as blocks 408 and 410, respectively, in the block diagram of the ASP shown in FIG. 4.

FIGS. 6-10 are control-flow diagrams that illustrate one embodiment of the ASP software routines that implement the account interface and authentication interface discussed above with reference to FIG. 2 and shown as blocks 408 and 410, respectively, in the block diagram of the ASP shown in FIG. 4. FIG. 6 is a high-level control-flow diagram illustrating the overall functionality of the ASP software. FIG. 6 shows an endless loop in which the ASP receives and handles requests. Received requests may be queued by lower-level operating-system routines, and ASP software may then subsequently dequeues and handles each received request using operating-system-provided utilities and routines. In step 602, the ASP dequeues and receives the next request transmitted by an ASP client or user. If the request is an ASP-client-transaction request, as determined in step 604, then an ASP-client transaction routine is called, in step 606, following execution of which control returns to step 602. Otherwise, if the request is a user-account request, as determined in step 608, then a user-account-request routine is called, in step 610, after execution of which control flows back in step 602. Otherwise, if the request is a user-initialization request, as determined in step 612, then a user-initialized-request routine is called, in step 614, after execution of which control flows back to step 602. If the received request is an ASP-client-initialization request, as determined in step 616, then an ASP-client-initialization routine is called, in step 618, after execution of which control flows back in step 602. If another type of request has been received, as determined in step 620, then an appropriate handler for that type of request is called, in step 622, after execution of which control flows back to step 602. Thus, at the highest level, the ASP software comprises a request-handling loop that handles each received request, in turn.

Figure 7:
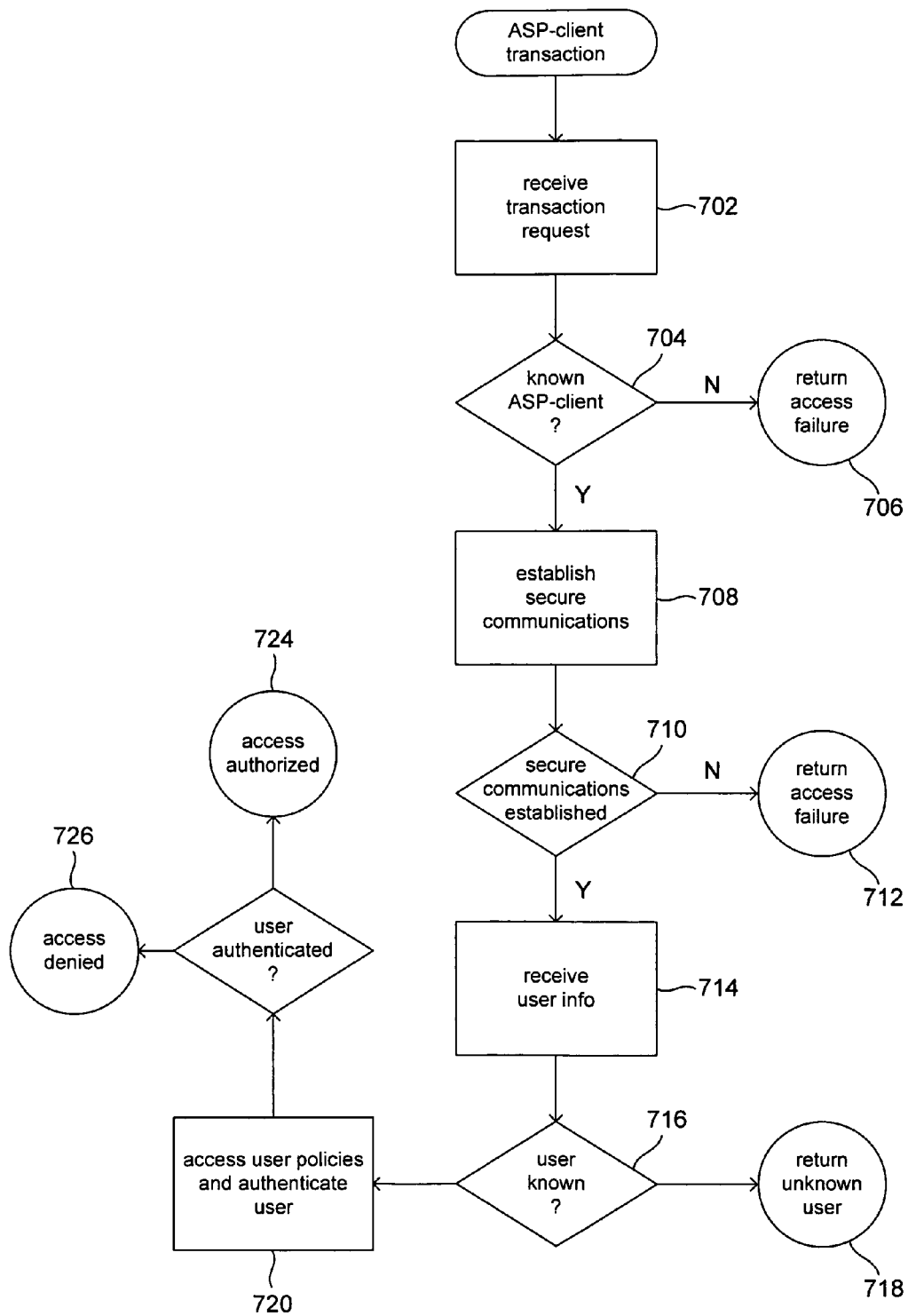

FIG. 7 is a control-flow diagram of the ASP-client-transaction routine called in step 606 of FIG. 6. In step 702, the ASP-client-transaction routine receives the ASP-client-transaction request. In step 704, the ASP-client-transaction routine accesses ASP-client information (1414 in FIG. 4) to determine whether or not a relationship has been established with the ASP client. Stored ASP-client-information may be used not only to identify the ASP-client, but also to authenticate the ASP-client. If the ASP-client that transmitted the received ASP-client-transaction request cannot be identified or authenticated, then an error is returned, in step 706, in certain embodiments. In alternative embodiments, the ASP-client-transaction routine continues, but uses constrained or limited authentication procedures, as discussed above. Otherwise, in step 708, the ASP establishes a secure communications link with the ASP client. If a secure communications link cannot be established, as determined in step 710, then an error is returned in step 712. Otherwise, in step 714, the ASP-client-transaction routine accesses user information stored in the received ASP-client-transaction request, in step 714, to determine whether or not the user is registered with the ASP by matching the user information in the transaction request with information stored in user information and policies (406 in FIG. 4). If the user is not identified, as determined in step 716, then an error is returned in step 718. Otherwise, in step 720, the identified user's policies are accessed and the ASP undertakes an authentication dialog with the identified user, as specified by one or more of the stored policies associated with the user, to authenticate the user. If authentication is achieved, then an access authorized value is returned to the ASP-client, in step 724. Otherwise, an access denied status is returned to the ASP client in step 726.

Figure 8:
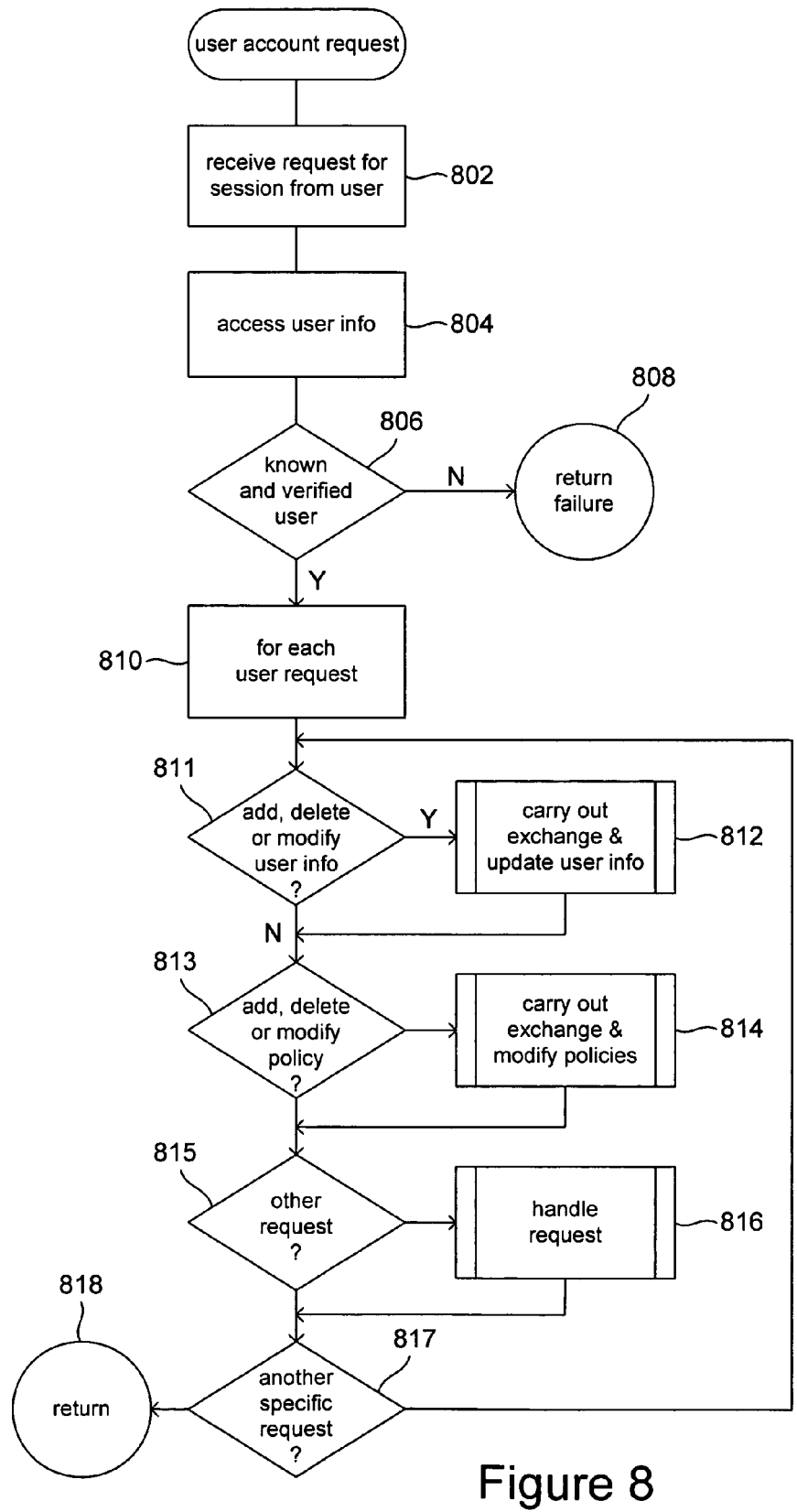

FIG. 8 shows a control-flow diagram of the routine "userAccountRequest," called in step 610 in FIG. 6. In step 802, the routine "userAccountRequest" receives the dequeued request for a user-account session from the user. In step 804, the routine "userAccountRequest" accesses stored user information (406 in FIG. 4) in order to identify and authenticate the user. It should be noted that this authentication process is carried out according to policies specified by the user during a user-initialization for a previous user-account session. If the user information included in the user account request corresponds to user information stored for a user within the ASP, as determined in step 806, and if the ASP cannot match user information in the user-account request with stored user information, or the ASP cannot authenticate the user according to policies specified by the user and stored by the ASP, then a failure is returned, in step 808. Otherwise, in the for-loop of step 810-817, the routine "userAccountRequest" receives and handles each specific request included in the received request, or subsequently transmitted by the user during a user-account session. In certain implementations, each subsequent specific request may be received and handled through the higher-level request-handling loop shown in FIG. 6. In alternative embodiments, the subsequent specific requests that are part of the dialog are passed through the operating system through a thread executing an instantiation of the routine "userAccountRequest." If the next received specific request is a request to add, delete, or modify user information, as determined in step 811, then the routine "userAccountRequest" carries out an appropriate dialog with the user in order to add, delete, or modify user information as desired by the user, in step 812. Otherwise, if the next specific request is a request to add, delete, or modify a policy, as determined in step 813, then the routine "userAccountRequest" calls a specific-request handler, in step 814, to carry out the addition, deletion, or modification of a policy. Other requests are handled by appropriate specific-request handlers in step 815 and 816. If another specific request is received, as determined in step 817, then control flows back to step 811. Otherwise, the routine "userAccountRequest" returns, in step 818, in many implementations following transmission of an end-of-session message or messages back to the user.

Figure 9:
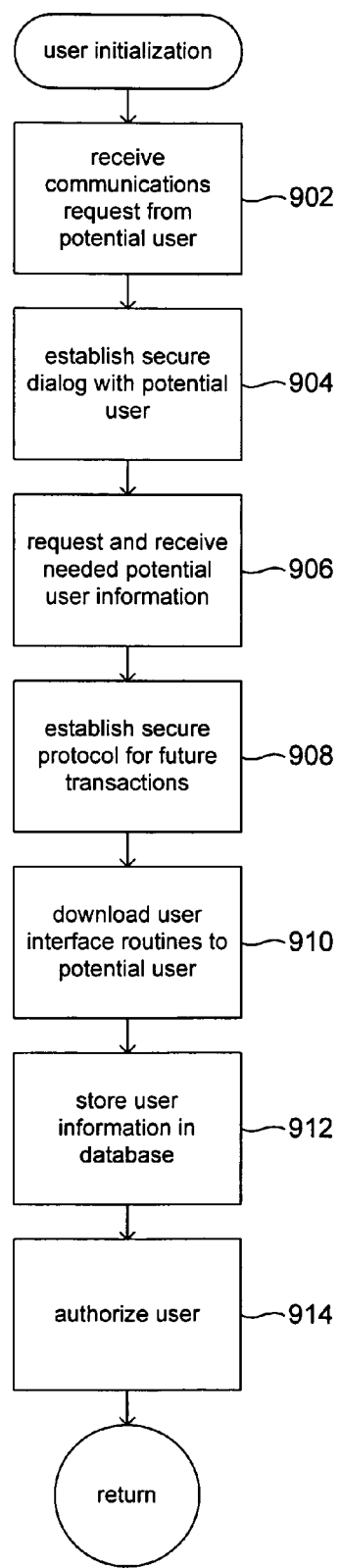
Figure 10:
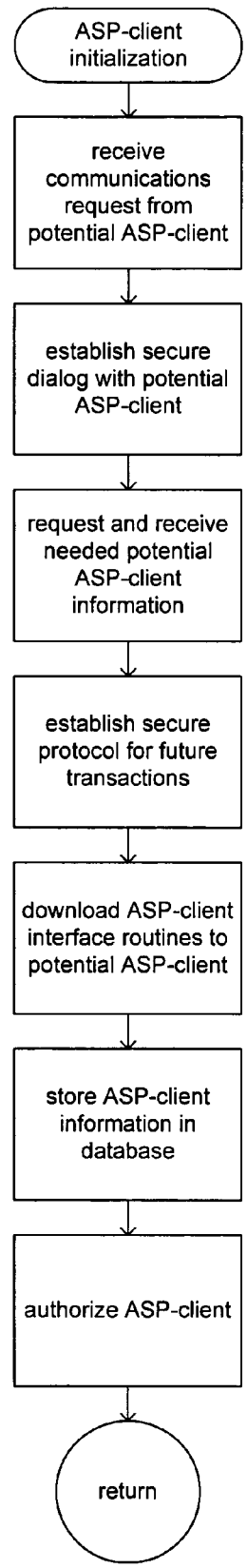

FIGS. 9-10 are simple control-flow diagrams for the user initialization and ASP-client-initialization routines called in steps 614 and 618 of FIG. 6, respectively. Only the routine "userInitialization" is described, since both routines are similar. In step 902, the user initialization routine receives a communication request from a potential user. In step 904, the routine "userInitialization" establishes a secure dialog with a potential user. In step 906, the routine "userInitialization" requests and receives user information from a potential user needed in order to establish a relationship with a user or, in other words, register the user for subsequent user authentication. In step 908, the routine "userInitialization" establishes a secure protocol for future transactions. This may involve establishing devices which the user may access user-account information, times, locations, and other such constraints, as well as establishing passwords and communications events needed to authenticate the user. In other words, in step 908, the user establishes policies for user access to the account interface. In step 910, the ASP may download various client-side user-interface routines to the potential user that allow the user to access the account interface using local routines, or a combination of local and remote routines, rather than using exclusively remote routines running on the ASP server. In step 912, the routine "userInitialization" stores the user information obtained from the potential user within the ASP, commonly within a database, as discussed above. Finally, in step 914, the routine "userInitialization" authorizes the user for subsequent account-interface access and for authentication via ASP-client-transaction requests sent from ASP-clients. As mentioned above, FIG. 10 is a control-flow diagram for ASP-client initialization using a similar set of steps to initialize an ASP-client for subsequent servicing of ASP-client-transaction requests. In certain embodiments, ASP-clients are logically similar to users, while, in other embodiments, ASP clients have markedly different utilization procedures, with the ASP storing markedly different types of information for ASP clients than for users. Error handling and error conditions are omitted from the control-flow diagrams of FIGS. 9 and 10, for the sake of clarity and brevity.

As mentioned above, the ASP provides three fundamental interfaces to users and ASP clients. The ASP correspondingly maintains appropriate levels of security for each of the interfaces. Security for the account interface and the communication-channel interface (206 and 208 in FIG. 2) are specified by users and stored as policies within the ASP. Security for the authentication interface may also be specified by ASP-client policies stored by the ASP, in certain embodiments, or, in alternative embodiments, may be determined by the ASP alone. In certain embodiments, for example, the ASP may require a virtual private network ("VPN") with the ASP-client in order to secure ASP-clients/ASP transactions. In certain embodiments of the present invention, the ASP may be implemented to receive and carry out ASP-client transactions on behalf of unregistered and unknown ASP clients. However, in these embodiments, the nature of authentication carried out by the ASP may be different, and more constrained, than the authentication that can be carried out for registered ASP clients. Constraints on authentication procedures for non-registered ASP clients are driven by the need to prevent denial-of-service attacks, and other potential security breaches.

There are many examples of policy-specified authentication procedures that may be carried out on behalf of both users and ASP clients by the ASP. In one example, as briefly discussed above with reference to FIG. 5, a user-specified policy may require the ASP to contact the user, during an electronic transaction, by a second communications medium other than the medium through which the electronic transaction has been carried out, and furnish the user with a randomly generated password through the second communications medium. The user can then furnish the received randomly generated password to the ASP client via the first communications medium in order to complete authentication. This provides a higher level of security and authentication than normal password-based authentication or two-phased authentication requiring a user to furnish a password as well as insert, for example, an ATM card into an ATM machine or provide an IP address via a transaction dialog.

User-specified policies may be specified in any of a large variety of different rule-encoding languages. Policies may specify any of a large number of different constraints and parameters associated with user-authentication processes carried out by the ASP, with different policies specified for different ASP clients or groups of ASP clients, different times, different geographical locations, different user devices, and a wide variety of other constraints and parameters. The stored policies for a user essentially comprises a set of encoded rules that are applied by the ASP during each ASP-client transaction seeking authentication of a user. Policies may be characterized as active, passive, or a combination of active and passive. Active policies require various types of ASP actions during the authentication process. For example, a variable-factor authentication, in which the ASP needs to communicate a password to a user through a cell phone during an electronic transaction over the Internet represents an active authentication policy. A passive policy may be policy that, for example, specifies that a user can only be authenticated for a particular ASP client if the user contacted the ASP client through a particular communications medium from a particular address.

As discussed above, a user may change, add, and delete policies at will. This allows a user to tailor authentication policies and to continuously modify policies in order to provide greater user-authentication security.

In certain embodiments, user authentication is carried out via a dialog between the ASP and user. In alternative embodiments, the ASP can proactively push information to ASP clients so that authentication routines running on the ASP clients, using information provided beforehand by the ASP, may carry out all or a portion of the authentication process. In alternative embodiments, a proxy ASP server can be installed on a server running, or controlled by, an ASP client.

A wide variety of alternative policies are possible. In addition to geographical, time, ASP-client identity, and user-device constraints, mentioned above, a user may specify, in policies, that authentication must take place using a particular protocol, that ASP-client-transaction requests seeking authentication of the user must transmit from particular addresses or sites, and other such constraints. Additionally, a user can specify a predetermined number of ASP-transaction requests that the ASP should service on behalf of the user before the user needs to reauthorize ASP authentication of the user. In other embodiments, the user may specify that the user must first contact the ASP to authorize authentication, prior to the ASP receiving an ASP-client-transaction request seeking to authorize the user. Users can specify that authentication should be locked out following some threshold number of unsuccessful attempts to authenticate the user. The user can additionally specify that the user should be alerted when any of various types of events, such as an irregular pattern of user authentication, occurs.

Although the present invention has been described in terms of particular embodiments, it is not intended that the invention be limited to these embodiments. Modifications within the spirit of the invention will be apparent to those skilled in the art. For example, the ASP can be implemented in an almost limitless number of different ways, using different control structures, data structures, hardware and software platforms, modular organizations, protocols, and any of various other myriad software-implementation choices and parameters. And a limitless number of different types of policies may be provided as policy templates to users to allow the user to specify any combination of the policies. ASPs may run on single server computers, on multi-processor systems, or on distributed computer systems. Multiple, geographically dispersed ASPs may be employed to efficiently handle ASP-client-transaction requests received through any of a wide variety of different types of communications media.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A user-authentication service implemented as routines that execute one or more computer systems interconnected by two or more communications media with both an authentication-service client, and a user, the user-authentication service comprising:

the one or more computer systems;
stored user-authentication policies specified by the user;
stored user information;
account interface routines that implement an account interface by which the user specifies, modifies, adds, and deletes user-authentication policies; and
authentication-interface routines that implement an authentication interface by which, following initiation of a transaction by the user with the authentication-service client, the authentication-service client submits an authentication request, through the first communications medium or through a second communications medium, to authenticate the user, the authentication-interface routines employing a variable-factor authentication, when specified to do so by stored user-authentication policies, to authenticate the user on behalf of the authentication-service client during which the user communicates with the user-authentication service through a third communications medium different from the first and second communications media and a user device different from that employed by the user to initiate the transaction with the authentication-service client.

2. The user-authentication service of claim 1 wherein the authentication service stores user-authentication policies and user information for multiple users, provides an account interface to the multiple users, and provides an authentication interface to multiple authentication-service clients.

3. The user-authentication service of claim 1 wherein the user-authentication service undertakes the authentication procedure by:
    using the electronically-encoded information about the user to retrieve all stored
    user-authentication policies for the user;
    when the retrieved stored user-authentication policies permit the authentication procedure to proceed, conducting the authentication procedure in order to authenticate the user to the authentication-service client; and returning an authentication result to the authentication-service client.

4. The user-authentication service of claim 3 wherein the authentication procedure for any single policy may comprise:
    a uni-directional or bi-directional exchange of information with the user through the third communications medium.

5. The user-authentication service of claim 4 wherein the information is a password that the user can subsequently input to the authentication-service client to prove to the authentication-service client that the user has been authenticated by the user-authentication service.

6. The user-authentication service of claim 5 wherein the authentication result includes the password.

7. The user-authentication service of claim 1 wherein the stored user information includes one or more of:
    the user's name;
    the user's address;
    passwords specified by the user;
    the user's contact information;
    the user's billing information; and
    the user's employment information.

8. The user-authentication service of claim 7 wherein the user's contact information includes one or more of:
    the user's computer's trusted communications addresses;
    trusted telephone numbers of the user's landline and cell phones;
    contact information for the user's trusted hand-held computing devices;
    the user's email addresses; and
    internet addresses for interne-related accounts through which the user can receive information.

9. The user-authentication service of claim 1 wherein a user-authentication policy specifies one or more of:
    constraints and parameters associated with user-authentication processes carried out by the user-authentication service on behalf of one or more, specified authentication-service clients.

10. The user-authentication service of claim 9 wherein constraints include one or more of:
    geographical constraints;
    time-of-day constraints;
    date constraints;
    communications-medium-related constraints;
    user-authentication service actions; and
    event constraints.

11. The user-authentication service of claim 10 wherein user-authentication service actions include one or more of:
    halting authorization service after detecting a specified event;
    employing particular types of user-authentication procedures; and
    providing alerts upon detecting specified events.

12. A method for authenticating, by an authentication service, a user of the authentication service to an authentication-service client that communicates with the user of the authentication service through a first communications medium, the method comprising:
    receiving user-identifying information from the authentication-service client;
    using the user-identifying information received from the authentication-service client to carry out an authentication procedure to authenticate the user of the authentication service by sending information to the user of the authentication service through a communications medium different from the first communications medium; and
    returning a authentication result to the authentication-service client.

13. The method of claim 12 wherein, as part of the authentication procedure, the authentication service transmits information to the user of the authentication service which the user of the authentication service then subsequently transmits to the authentication-service client.

14. The method of claim 12 wherein the user-authentication service undertakes the authentication procedure by:
    using the electronically-encoded information about the user to retrieve all stored user-authentication policies for the user;
    when the retrieved stored user-authentication policies permit the authentication procedure to proceed, conducting the authentication procedure in order to authenticate the user to the authentication-service client; and
    returning the authentication result to the authentication-service client.

15. The method of claim 14 wherein the authentication procedure for any single policy may comprise:
    a uni-directional or bi-directional exchange of information with the user through the third communications medium.

16. The method of claim 15 wherein the information is a password that the user can subsequently input to the authentication-service client to prove to the authentication-service client that the user has been authenticated by the user-authentication service.

17. The method of claim 16 wherein the authentication result includes the password.

* * * * *